(12) United States Patent
Tadolini et al.

(10) Patent No.: US 11,434,975 B2
(45) Date of Patent: Sep. 6, 2022

(54) NUBBED BELT

(71) Applicant: Megadyne S.P.A, Mathi (IT)

(72) Inventors: Giorgio Tadolini, Mathi (IT); Federico Airola, Mathi (IT)

(73) Assignee: MEGADYNE S.P.A., Mathi (IT)

( * ) Notice: Subject to any disclaimer, the term of this patent is extended or adjusted under 35 U.S.C. 154(b) by 235 days.

(21) Appl. No.: 16/959,515

(22) PCT Filed: Jan. 8, 2019

(86) PCT No.: PCT/IB2019/050132
§ 371 (c)(1),
(2) Date: Jul. 1, 2020

(87) PCT Pub. No.: WO2019/138322
PCT Pub. Date: Jul. 18, 2019

(65) Prior Publication Data
US 2021/0054905 A1    Feb. 25, 2021

(30) Foreign Application Priority Data

Jan. 9, 2018 (IT) .......................... 102018000000645

(51) Int. Cl.
*F16G 1/28* (2006.01)
*F16G 1/08* (2006.01)

(52) U.S. Cl.
CPC ...... *F16G 1/28* (2013.01); *F16G 1/08* (2013.01)

(58) Field of Classification Search
CPC ... F16H 7/02; F16H 7/023; F16G 5/20; F16G 1/28; F16G 1/08

(Continued)

(56) References Cited

U.S. PATENT DOCUMENTS

| 1,028,783 A * | 6/1912 | Von Rabenau ............ F16G 5/16 |
| | | 474/251 |
| 1,255,525 A * | 2/1918 | Gardner .................... F16G 1/28 |
| | | 474/249 |

(Continued)

FOREIGN PATENT DOCUMENTS

| AT | 299630 B | 6/1972 |
| EP | 0957289 A1 | 11/1999 |

(Continued)

OTHER PUBLICATIONS

International Search Report and Written Opinion from International Application No. PCT/IB2019/050132 dated May 3, 2019.

*Primary Examiner* — Henry Y Liu
(74) *Attorney, Agent, or Firm* — Dorsey & Whitney LLP

(57) ABSTRACT

A belt having a rear face and a front surface, which is opposite the rear face, is suitable to be coupled to at least one pulley and has a plurality of nubs, which project from a band portion, in which cords are embedded; the nubs have the same shape and sizes as one another, are arranged along a plurality of rows parallel to a longitudinal axis of the belt, and are longitudinally spaced apart from one another with a constant pitch; each nub ends, in a longitudinal direction, with two end portions opposite one another and is provided with an intermediate portion, which joins the end portions to one another and has two sides, which are parallel to the longitudinal axis.

6 Claims, 3 Drawing Sheets

(58) Field of Classification Search
USPC .......................................................... 474/249
See application file for complete search history.

(56) References Cited

U.S. PATENT DOCUMENTS

| | | | | | |
|---|---|---|---|---|---|
| 1,309,066 | A | * | 7/1919 | Gilardini | F16G 5/20 474/251 |
| 1,442,268 | A | * | 1/1923 | Gusdorf | F16G 1/02 474/237 |
| 1,457,243 | A | * | 5/1923 | Gusdorf | F16G 1/28 474/237 |
| 1,457,569 | A | * | 6/1923 | Gusdorf | F16G 5/02 474/265 |
| 1,635,363 | A | * | 7/1927 | Handley | F16H 9/08 474/249 |
| 1,661,300 | A | * | 3/1928 | Perpall | F16G 1/28 474/249 |
| 1,770,301 | A | * | 7/1930 | De Bruin | F16G 1/02 474/249 |
| 1,860,269 | A | * | 5/1932 | Stokes | F16G 5/00 474/249 |
| 1,994,604 | A | * | 3/1935 | Bohne | F16G 1/02 474/251 |
| 2,017,291 | A | * | 10/1935 | Pfleger | F16G 5/06 474/249 |
| 2,054,619 | A | * | 9/1936 | Freedlander | B29D 29/106 474/271 |
| 2,181,001 | A | * | 11/1939 | Smith | F16G 1/28 24/39 |
| 2,221,984 | A | * | 11/1940 | Mckay | B29D 29/00 264/293 |
| 2,295,432 | A | * | 9/1942 | Smith | B65G 15/42 428/167 |
| 2,405,496 | A | * | 8/1946 | Gingras | F16G 5/02 474/251 |
| 2,677,969 | A | * | 5/1954 | Waugh | F16G 5/20 428/161 |
| 4,196,640 | A | * | 4/1980 | Rydberg | F16H 7/02 474/170 |
| 4,832,672 | A | * | 5/1989 | Bielfeldt | B32B 27/304 428/137 |
| 4,976,662 | A | * | 12/1990 | Miranti, Jr. | F16G 1/28 156/137 |
| 5,011,461 | A | * | 4/1991 | Brouwers | F16H 9/24 474/201 |
| 5,055,090 | A | * | 10/1991 | Miranti, Jr. | F16G 1/28 474/250 |
| 5,211,608 | A | * | 5/1993 | Wong | F16H 7/023 474/202 |
| 5,215,504 | A | * | 6/1993 | Wong | F16G 1/28 474/237 |
| 5,342,250 | A | * | 8/1994 | Sanders | B29C 66/4322 156/137 |
| 6,045,474 | A | * | 4/2000 | Smeets | F16G 5/16 188/245 |
| 6,148,496 | A | * | 11/2000 | McGuire | B44B 5/026 29/445 |
| 6,949,211 | B2 | * | 9/2005 | Lederer | F16G 5/20 156/137 |
| 7,008,341 | B2 | * | 3/2006 | Wilson | F16G 5/20 474/205 |
| 7,806,793 | B2 | * | 10/2010 | Yoshida | F16G 5/16 474/240 |
| 7,971,687 | B2 | * | 7/2011 | Alves | D07B 1/162 474/260 |
| 7,988,577 | B2 | * | 8/2011 | Omori | F16G 5/20 474/263 |
| 9,011,283 | B2 | * | 4/2015 | Shiriike | F16G 5/08 474/263 |
| 2007/0105674 | A1 | * | 5/2007 | Hogn | F16H 7/023 474/152 |
| 2009/0105027 | A1 | * | 4/2009 | Takahashi | F16G 1/08 474/249 |
| 2010/0203993 | A1 | * | 8/2010 | Matsukawa | F16G 5/20 474/251 |
| 2015/0148163 | A1 | * | 5/2015 | Kusano | F16G 1/10 264/293 |
| 2018/0283495 | A1 | * | 10/2018 | Okubo | F16G 1/28 |

FOREIGN PATENT DOCUMENTS

| | | |
|---|---|---|
| JP | 2002139104 A | 5/2002 |
| JP | 2007032638 A | 2/2007 |
| WO | 2005059400 A1 | 6/2005 |

* cited by examiner

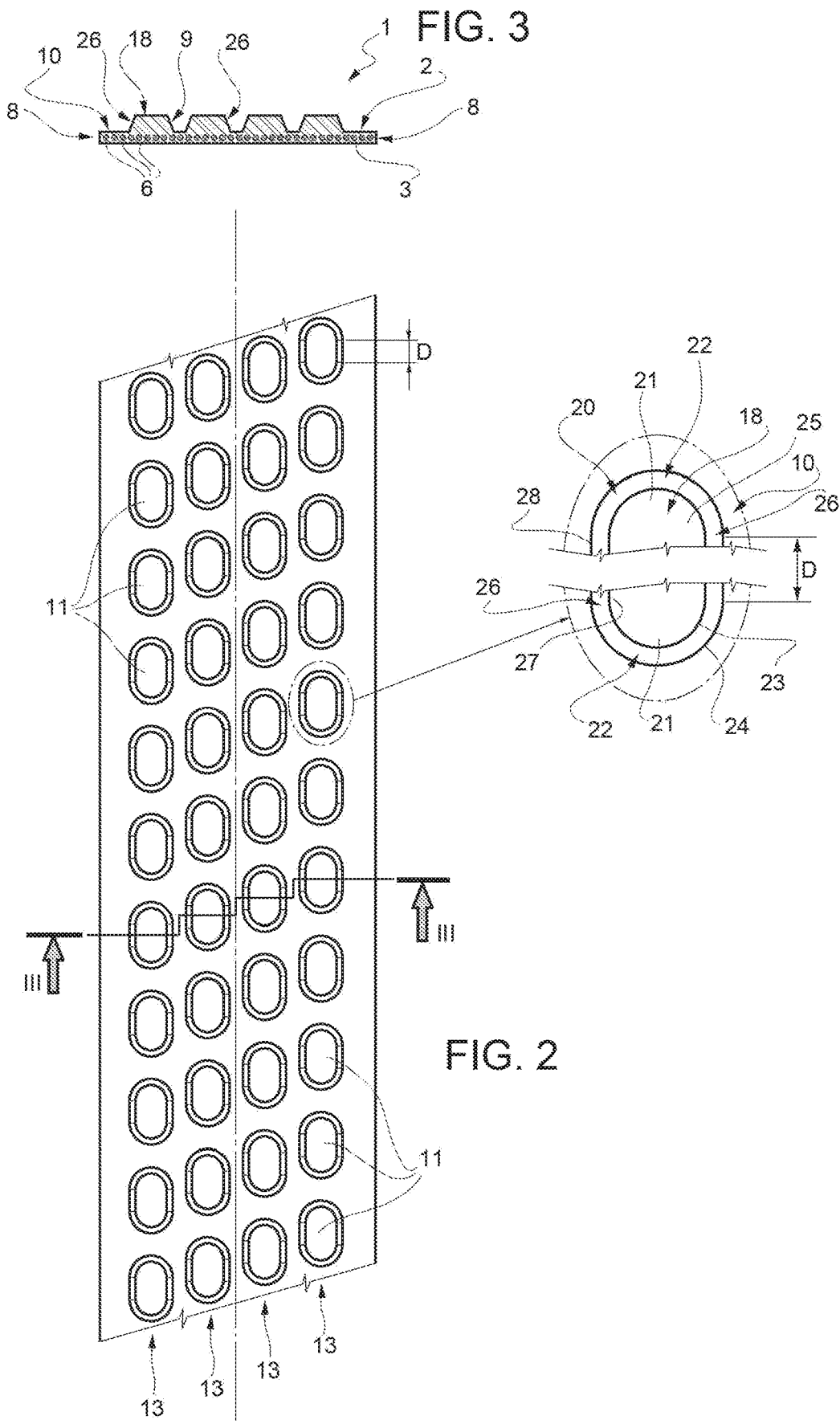

NUBBED BELT

CROSS-REFERENCE TO RELATED APPLICATIONS

This patent application claims priority from Italian patent application no. 102018000000645 filed on Sep. 1, 2018, the entire disclosure of which is incorporated herein by reference.

TECHNICAL FIELD

The invention relates to a nubbed belt, for the transmission of motion and/or for the transportation of objects.

BACKGROUND ART

In the technical fields of transmissions and conveyors, different types of belts are used, namely flat belts, toothed belts, trapezoidal belts, multi-trapezoidal belts, etc., having a rear surface and a front surface, which is opposite the rear surface and is coupled to driving and driven pulleys having, on the outer surface, a profile corresponding, in negative, to the one of the belt. In other words, the outer surface of the pulleys is perfectly cylindrical for flat belts, whereas it is provided with recesses parallel to the rotation axis in case of toothed belts, so as to define a synchronous transmission; finally, it is provided with annular grooves for trapezoidal and multi-trapezoidal belts.

Therefore, every type of belt is evidently associated with a corresponding pulley technology.

However, there is the need to provide synchronous belts which, though, can also be used with pulleys having a perfectly cylindrical outer surface and with pulleys provided with circumferential grooves.

In order to fulfill this need, known belts can be used, which are provided with nubs or projecting blocks, distributed on the front surface of the belt along a series of parallel longitudinal rows. These belts are commonly known as "nubbed belts". The nubs of each row are usually staggered in a longitudinal direction relative to the nubs of an adjacent row, so as to cause the mashing of the nubs in the corresponding recesses available in pulleys to be gradual, thus limiting the oscillations of the torque transmitted by the belt upon variation of the rotation angle of the pulley.

An embodiment concerning this type of belts is disclosed in EP0957289A1, which corresponds to the preamble of claim 1 and shows different possible shapes for the nubs. In particular, the only solution used in the market is the one having nubs with the shape of a truncated cone with a circular base, suited to engaged corresponding recesses in the pulleys.

As already mentioned above, a solution of this type can theoretically be used also with pulleys provided with circumferential grooves, where each groove would be engaged by a respective row of nubs. In particular, the transmission of torque would take place in areas of contact between the inclined sides of the grooves and the side surface of the nubs with the shape of a truncated cone.

There is the need to improve the belt described in EP0957289A1 so as to improve the performances of the transmission when the nubbed belt is used with pulleys provided with circumferential grooves, instead of being used with pulleys provided with recesses spaced apart from one another in a circumferential direction for a synchronous transmission.

Other know solutions are disclosed in document AT 299630 B, which relates to pulleys cooperating with flat belts despite being provided with cavities on their outer side surface, and in document JP 2002 139104 A, which relates to a belt provided with nubs on the rear surface.

DISCLOSURE OF INVENTION

The object of the invention is to provide a nubbed belt, which fulfills the needs discussed above in a simple and cost-effective manner.

According to the invention, there is provided a nubbed belt as defined in claim 1.

BRIEF DESCRIPTION OF THE DRAWINGS

The invention will now be described with reference to the accompanying drawings, which show a non-limiting embodiment thereof, wherein:

FIG. 2 is a view of a front surface of the belt of FIG. 1;

FIG. 3 is a cross section according to line III-III of FIG. 2;

BEST MODE FOR CARRYING OUT THE INVENTION

Figure 1:
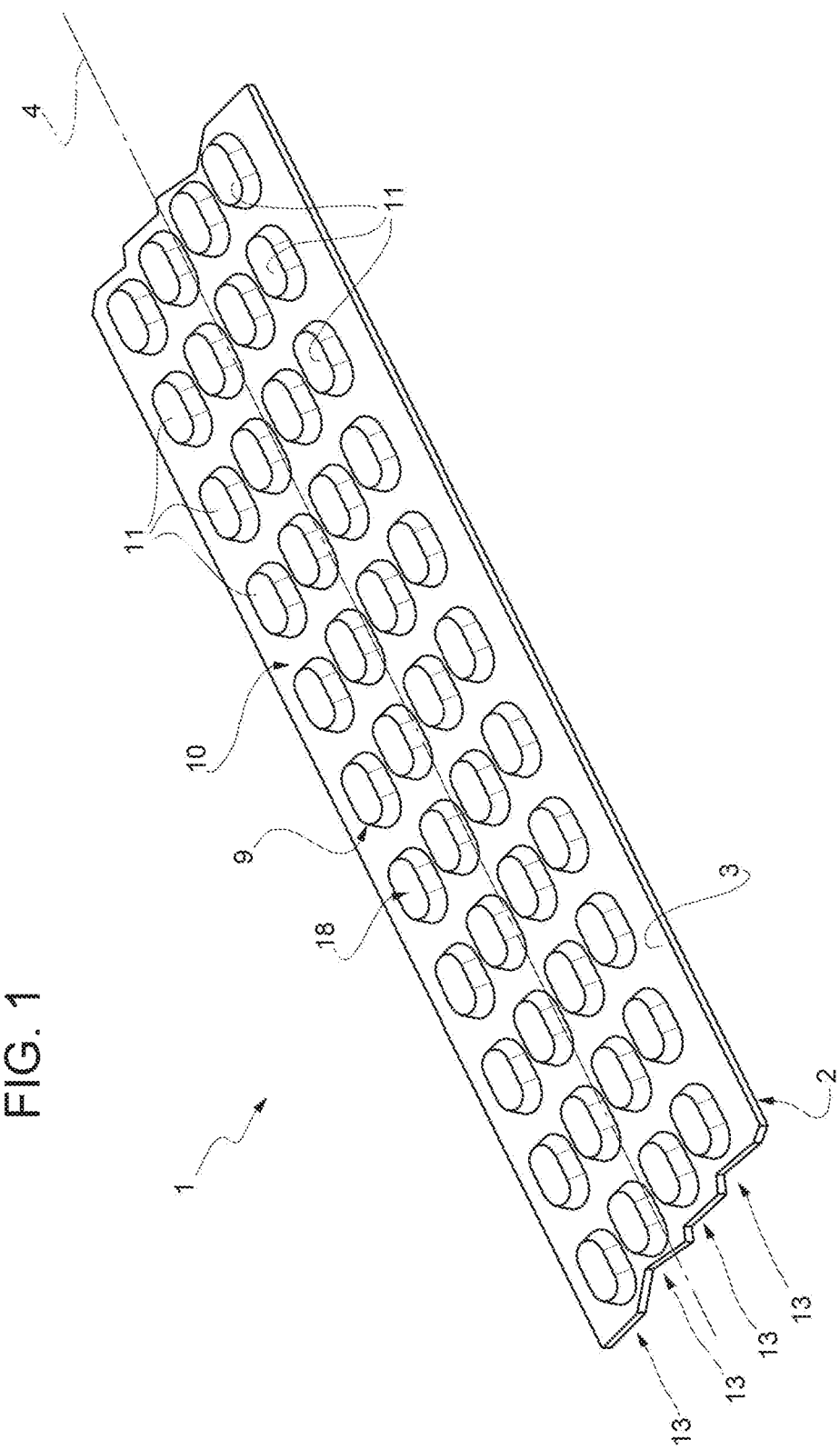
FIG. 1 is a partial perspective view of a preferred embodiment of the nubbed belt according to the invention.

In FIG. 1, number 1 indicates, as a whole, a (partially shown) belt, which can form a continuous ring suited to be wound on a driving pulley and at least a driven pulley, so that it can be used for the transmission of power between said pulleys and/or be used for the transportation of objects in a conveyor provided with such pulleys.

The belt 1 comprises a body 2 made of a polymer or elastomer material, for example polyurethane or rubber, which comprises, in turn, a band portion or flat portion 3, which extends along a longitudinal axis 4 and has a substantially rectangular cross section.

According to FIG. 3, the belt 1 further comprises a plurality of reinforcement threadlike inserts 6, which are usually known as "cords", are embedded in the portion 3, are substantially longitudinal, and are made of a material resistant to tensile stress, for example steel or aramid fibres, glass fibres or other synthetic fibres.

The belt 1 is flexible so as to follow a closed ring path, defined by the aforesaid pulleys and by possible idler pulleys, and is delimited by a rear face 7, by two side surfaces 8 opposite one another, and by a front dragging surface 9, which is opposite the face 7 and is suited to engage an outer side surface of the pulleys.

With reference to FIG. 1, again, the surface 9 is shaped so as to define a substantially flat face 10 and a plurality of projecting blocks or nubs 11, which project from the face 10. The shape and sizes of the nubs 11 and the distances between said nubs 11 are not necessarily shown, in the figures, on a scale, which means that the figures should be taken into account by mere way of example.

Figure 4:
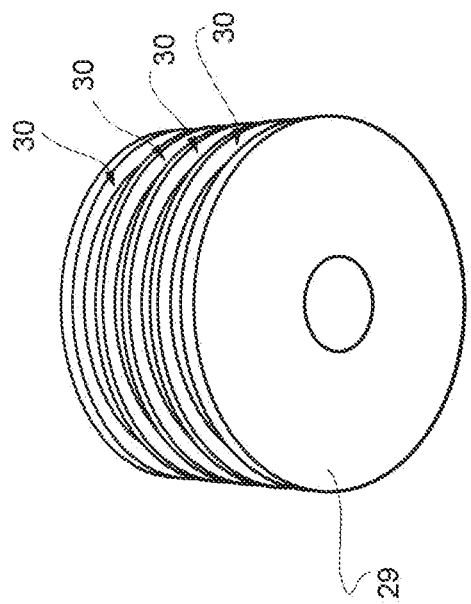
FIGS. 4, 5 and 6 show three different pulleys to be coupled to the belt of FIGS. 1 to 3.

The nubs 11 are arranged along two or more rows 13, which are parallel to the axis 4, and all have the same shape and sizes. Furthermore, the longitudinal distance or pitch between the nubs 11 is constant and is the same for all the rows 13, just like the distance between the rows 13 is constant. In other words, the distribution or "pattern" of the nubs 11 is always the same and is repeated along the axis 4. As a consequence, the belt 1 can be coupled to a pulley 14 (FIG. 4) provided with recesses 15 on an outer side surface of its: the recesses 15 have the same distribution or "pattern" as the nubs 11 and have a shape that is such that they can be respectively engaged by the nubs 11 and define a synchronous transmission.

With reference to FIG. 2, for each row 13, the nubs 11 preferably are longitudinally staggered relative to the nubs 11 of an adjacent row 13. In this way, there always is at least one recess 15 engaged by a corresponding nub 11 in order to transmit the torque, but the recesses 15 of different rows are progressively engaged one after the other. This solution leads to a reduction of the oscillations of the torque totally transmitted between the belt 1 and the pulley 14 upon variation o the rotation angle of the pulley 14.

The nubs 11 preferably are part of the body 2, namely they are integral to the portion 3, which means that they are made of the same material. According to variants which are not shown herein, the nubs 11 are defined by distinct pieces of the portion 3 and are fixed to the latter during the manufacturing procedure. In this case, they can be made of the same material as the portion 3 or of a different polymer or elastomer material.

The nubs 11 are preferably made of a solid material. Alternatively, the nubs 11 can also be hollow on the inside. According to further variants which are no shown herein, the surface 9 and/or the rear face 7 are defined by coating layers, which are fixed to the body 2 during the manufacturing process.

Since they are all the same, this description—for the sake of simplicity—will refer to one single nub 11.

With reference to the enlargement included in FIG. 2, the nub 11 preferably has a symmetrical shape, both relative to a middle plane orthogonal to the axis 4 and relative to a middle plane parallel to the axis 4 and orthogonal to the face 10.

Figure 5:
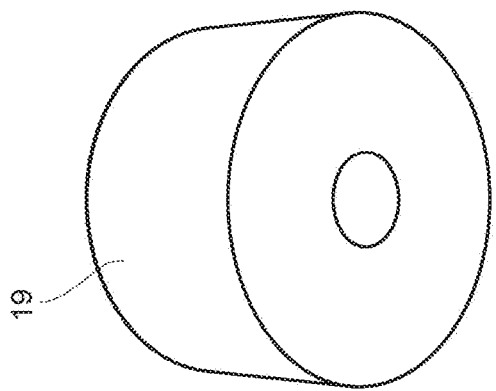

The nub 11 is delimited, at the front, by a face 18, which is substantially flat and parallel to the face 10. When the belt 1 is used in combination with a cylindrical pulley 19 (FIG. 5), the latter has a cylindrical outer surface, against which the faces 18 or the back face 7 can rest so as to transmit the motion and/or so as to obtain an idler pulley function.

With reference to the enlargement of FIG. 2, again, the nub 11 is laterally delimited by a perimeter surface 20, which joins the faces 10 and 18 to one another.

In a direction parallel to the axis 4 (i.e. in the direction of the rows 13), the nub 11 ends with two head portions 21, which are opposite one another and have respective surfaces 22 that are part of the surface 20 and preferably are convex.

Each surface 22 ends with a relative convex edge 23 in the area of the face 18 and with a relative convex edge 24 in the area of the face 10; the edges 23 and 24 preferably are arcs of a circle. According to a variant which is not shown herein, they are arcs of an ellipse.

Each surface 22 advantageously is tapered from the edge 24 to the edge 23. In other words, the bending radius of the edges 23 is smaller than the one of the edges 24. In particular, each one of the portions 21 defines half of a truncated cone. According to a variant which is not shown herein, each one of the portions 21 defines half a cylinder, which means that the edges 23 and 24 have the same profile and are aligned in a direction orthogonal to the faces 10 and 18.

According to the invention, the nub 11 comprises an intermediate portion 25, which joins the portions 21 to one another and is defined by two sides 26, which are parallel to the axis 4, are part of the surface 20 and longitudinally join the surfaces 22 to one another, preferably without steps and without gaps.

Each side 26 ends with a relative straight edge 27 in the area of the face 18 and with a relative straight edge 28 in the area of the face 10. In the example shown herein (FIG. 2), the sides 26 are flat and are inclined at an angle other than 90° relative to the faces 10 and 18. In other words, the cross section of the portion 25 (with section planes orthogonal to the axis 4) is trapezoidal.

According to variants which are not shown herein, the sides 26 have a convex or concave profile moving from the face 10 to the face 18; and/or the sides 26 extend orthogonally to the face 18 and/or to the face 10.

With reference to the enlargement of FIG. 2, again, in a direction parallel to the axis 4, the sides 26 preferably have a length D which is greater than or equal to 0.5 mm and, advantageously, smaller than or equal to 10 mm. This preferable maximum limit of the length D does not jeopardize the ability of the belt 1 to flex and adjust to pulleys with a relatively small diameter.

Figure 6:
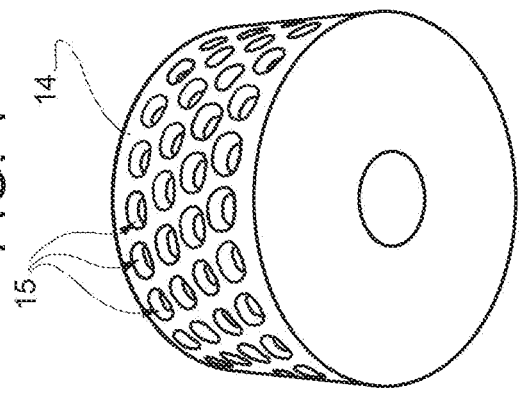
Figure 7:
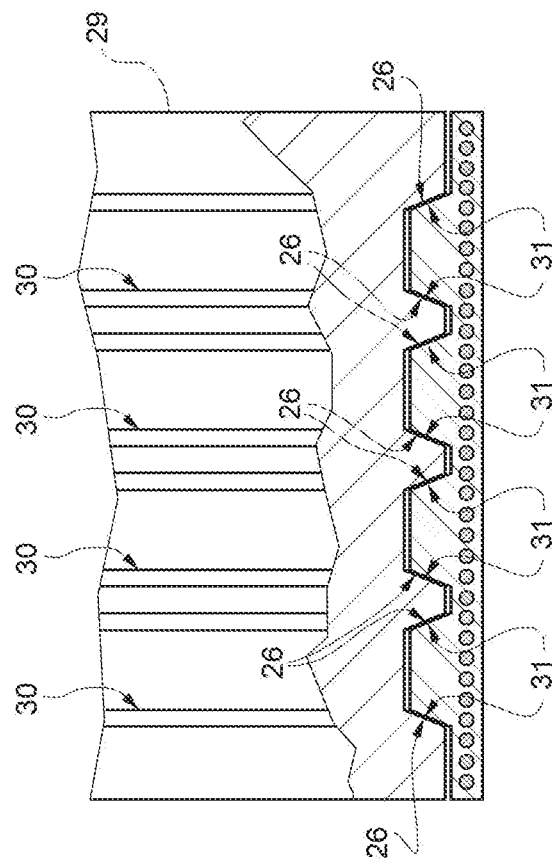
FIG. 7 is similar to FIG. 3 and shows, on a larger scale, the belt of the invention when it is coupled to the pulley of FIG. 6.

The belt 1 can also be coupled, besides to the pulleys 14 and 19, to a pulley 29 (FIGS. 6 and 7) provided with circumferential grooves 30, which have, in cross section, a shape that is such that they can be engaged by the portion 25 and are axially spaced apart from one another by the same distance present between the rows 13. In other words, the nubs 11 engage the grooves 30, with the sides 26 arranged in contact against respective sides 31 (FIG. 7) of the grooves 30, so as to transmit the dragging through friction between the sides 26 and 31.

Therefore, thanks to the presence and the longitudinal extension of the sides 26, the extent of the torque between the pulley 29 and the belt 1 is increased compared to known solutions, wherein the nubs have the shape of a truncated cone with a circular base. Indeed, the transmission of this torque takes place in a relatively large area, corresponding to an extended and continuous contact between the sides 26 and 31.

It is also evident that this technical effect is obtained in an extremely simple fashion, without significantly altering the other features of the belt 1 and, hence, without jeopardizing the other functions, in particular in terms of ability to adjust to different uses, efficiency in the transmission and synchrony of the transmission when the belt 1 is used in combination with the pulley 14.

Finally, owing to the above, the belt 1 disclosed herein can evidently be subjected to changes and variations which do not go beyond the scope of protection of the invention. In particular, as already mentioned above, the portions 21 could have a different shape and/or the sides could have a different longitudinal size compared to what shown and/or discussed herein. Furthermore, the shape of the nubs 11 could be non-symmetrical, for example the head portions 21 of each nub 11 could have different shapes and/or sizes.

The invention claimed is:

1. A belt having a rear face and a front surface that is opposite to the rear face and is suitable to be coupled, in use, to outer side surfaces of a driving pulley and of a driven pulley, the belt comprising:
   a flat portion extending along a longitudinal axis;
   a plurality of cords embedded in the flat portion; and
   a plurality of nubs that project from the flat portion at the front surface, have the same shape and sizes as one another, are arranged along a plurality of rows parallel to the longitudinal axis, and are longitudinally spaced from one another with a constant pitch; each of the plurality of nubs ending, in a direction parallel to the longitudinal axis, with two end portions opposite one another; each of the plurality of nubs includes an intermediate portion that joins the end portions to one another and has two sides that are parallel to the longitudinal axis.

2. The belt according to claim 1, wherein the plurality of rows of nubs are parallel to the longitudinal axis over the entire front surface.

3. The belt according to claim 1, wherein, in a direction parallel to the longitudinal axis, the two sides have a length greater than or equal to 0.5 mm.

4. The belt according to claim 1, wherein, in a direction parallel to the longitudinal axis, the two sides have a length less than or equal to 10 mm.

5. The belt according to claim 1, wherein the intermediate portion has a trapezoidal cross section obtained by cross section planes orthogonal to the longitudinal axis.

6. The belt according to claim 1, wherein, in each of the plurality of rows, the plurality of nubs are longitudinally staggered with respect to the nubs of one of the adjacent rows of the plurality of rows.

\* \* \* \* \*